June 11, 1963 H. H. LEVINSON 3,093,443
PROCESS FOR PRODUCING A VULCANIZED RUBBER GASKET
Filed March 13, 1961 2 Sheets-Sheet 1
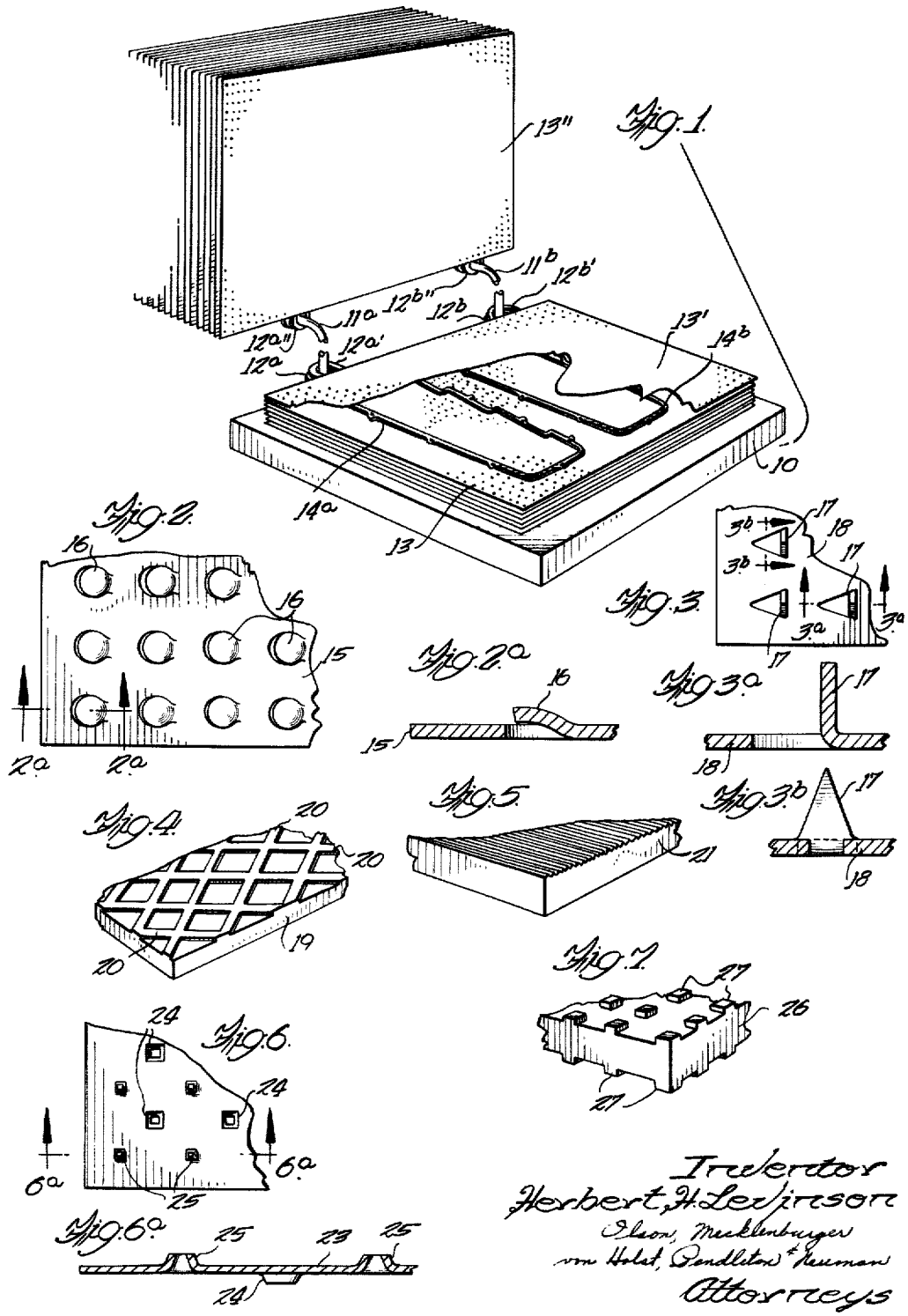
Inventor
Herbert H. Levinson
Olson, Mecklenburger,
von Holst, Pendleton & Neuman
Attorneys June 11, 1963  H. H. LEVINSON  3,093,443
PROCESS FOR PRODUCING A VULCANIZED RUBBER GASKET
Filed March 13, 1961  2 Sheets-Sheet 2
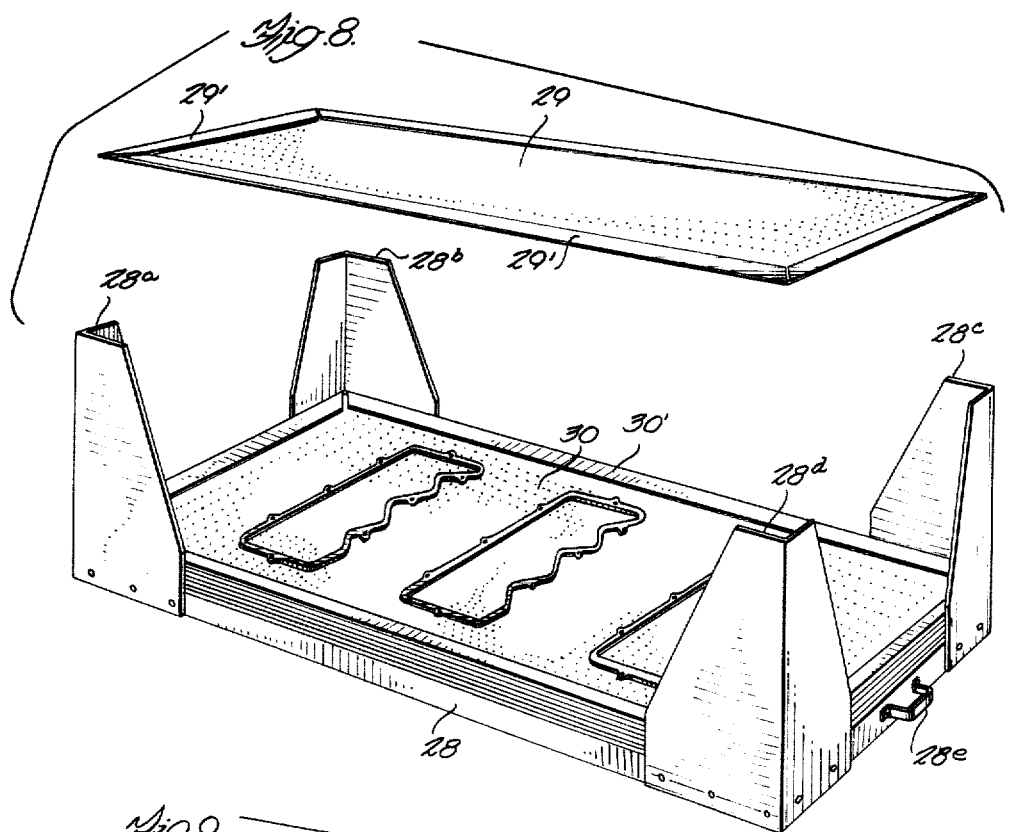
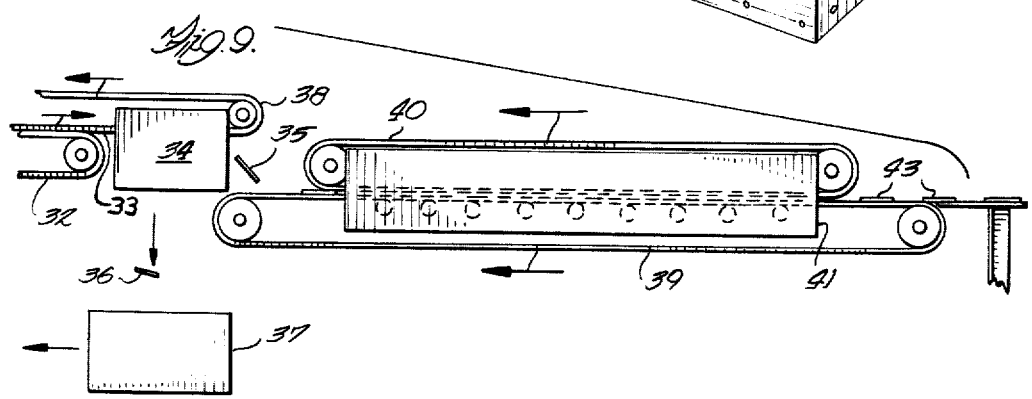

United States Patent Office 3,093,443
Patented June 11, 1963

3,093,443
PROCESS FOR PRODUCING A VULCANIZED
RUBBER GASKET
Herbert H. Levinson, Northbrook, Ill., assignor to Felt
Products Mfg. Co., Skokie, Ill., a corporation of
Illinois
Filed Mar. 13, 1961, Ser. No. 95,406
8 Claims. (Cl. 18—47.5)

This application relates to the inexpensive production of articles having ingredients which are cured, usually at elevated temperatures, during the manufacture thereof, particularly articles which must also meet size specifications, for example, rubber-containing sealing means, such as resilient gaskets, washers, seals, packings, diaphragms, and the like, hereinafter referred to collectively as gaskets. More specifically, it also relates to a novel process and apparatus for the economical production of rubber-containing gaskets such as automobile cylinderhead gaskets, cylinderhead cover gaskets, oil pan gaskets, chain cover gaskets, manifold gaskets, and the like, which process and apparatus lends itself to either large or small-volume production runs as well as automated production techniques.

For many years, cork and compositions containing substantial proportions of cork have been used for the manufacture of gaskets, even though it has been recognized that, in many instances, a rubber-based gasket, rather than a cork-based gasket, would provide superior performance. Despite superior performance, however, rubber-based gaskets have enjoyed only limited use because of substantially-higher cost.

The relatively-high cost of rubber gaskets is attributable to both high material and high production costs. One reason for the high material costs is the high cost of the raw materials and the fact that only a fraction of the resulting rubber-containing sheet stock actually ends up as gasket material, whereas as much as 80 percent or more ends up as scrap. To cope with this situation, gaskets are now being cut to the finished configuration from uncured, rather than cured or vulcanized, rubber-containing gasket stock so that practically all of the scrap material can be reworked. If the material were already cured before cutting, the cured scrap could not readily and directly be reworked with the uncured raw material without special processing.

One of the disadvantages associated with pre-cutting gaskets to the finished configuration from uncured stock arises from the fact that the uncured gaskets, unless restrained, tend to shrink (sometimes as much as 5-20%, or more) and change shape during the subsequent curing operation, possibly due, at least in part, to process strains from prior mechanical working and the tendency, particularly at elevated temperatures, to return to former orientations. This problem becomes quite critical in the case of irregularly-shaped gaskets, i.e., gaskets which are not purely rectilinear, because of the complex stresses set up during cure and the not-always-predictable deforming strains resulting therefrom, particularly adjacent curvilinear edges. Curing forms have been devised to control this change, but these forms are so costly that tooling up for the operation is usually economically attractive only in the case of large production runs. Further, the use of curing forms for gaskets does not readily lend itself to high-capacity, automated or continuous production techniques.

It is, therefore, an object of the present invention to provide an inexpensive method and apparatus for decreasing the cost of manufacturing rubber-containing gaskets, particularly irregularly-shaped gaskets.

It is a further object of the present invention to provide a method for curing rubber-containing gaskets, which method lends itself to the cutting of the finished gasket configuration directly from uncured stock and which also eliminates scrap losses and the need for high-cost curing forms.

It is a still further object of the present invention to provide a waste-free method of manufacturing gaskets with minimum tooling expense, wherein scrap material may be directly reworked without special processing.

It is a still further object of the present invention to provide an economical method for producing rubber-containing gaskets which lends itself to both large and small-volume-production runs and also to automated production techniques.

These and other objects of the present invention will become apparent as the detailed description thereof proceeds.

To achieve these objects a process is herewith provided which in one embodiment comprises frictionally restraining an uncured-rubber-containing stock, which has previously been shaped to a desired finished gasket configuration, and curing the stock while so restrained, whereby the gasket configuration is dimensionally and geometrically stabilized while undergoing cure. Any uncured scrap stock resulting from the gasket-shaping operation is returned for direct reworking, where it is usually combined with additional uncured stock and reused.

Typically, the raw material is a sheet of uncured-rubber-containing stock, usually containing a curing accelerator, activator, catalyst, and/or the like, from a sheeting operation, i.e., an operation wherein the rubber-containing stock is compounded and/or formed into a sheet of the desired thickness. For purposes of this description the sheeting or sheet-forming operation may or may not include the preliminary steps of formulating and compounding the stock, e.g., in an internal mixer (e.g., a Banbury mixer) or on an open mill, as well as subsequent steps, e.g., calendering, extrusion (including extrusion by roller-die and compounding extruders), and/or the like.

After being formed into a sheet, the stock is cut, punched or otherwise shaped into a desired gasket configuration. The uncured gasket is then sandwiched between apposed plates which have a substantial coefficient of friction with respect to the surfaces of the gasket in contact therewith, said surfaces usually being parallel surfaces of the gasket which usually abut the surfaces to be sealed. Typically, the plates are metallic sheets, e.g., aluminum, steel, copper, or the like, but they may also comprise non-metallic materials, e.g., heat-resistant plastics, fiber glass and plastic compositions, or the like, and combinations of such metals and non-metals.

By a "substantial coefficient of friction" is meant a coefficient of friction which is sufficient, under the particular pressure employed (which must not be great enough to cause excessive squashing or "spreading" of the gasket), to frictionally restrain the gaskets so that the stresses set up during curing do not result in any substantial distortion. The substantial coefficient of friction is readily and inexpensively obtained by using a "sandwich" having apposed plates with a plurality of protrusions thereon, e.g., sharp points, or which have roughened, uneven, or irregular surfaces. Typical examples of such plates will be described and illustrated hereinafter in connection with the drawings. For any particular gasket formulation and configuration, the selection of appropriate plate surfaces is well within the skill of the art in the light of the present description.

The resulting "sandwich" which, in many instances may be an alternating series of gaskets and plates forming a stack, is then subjected to curing conditions, usually including elevated temperatures, for a period sufficient to cure the rubber in the stock. The curing temperatures, which may range from room temperature up but are usually above 200° F., e.g., 200 to 700° F., and periods employed, which may range from seconds to hours, are not, per se, the basis of novelty herein and depend, in part, on the particular rubber-containing formulation employed, the thickness thereof, and the like.

For example, the curing, i.e., cross linking or vulcanization, of the uncured rubber may be carried out in a curing zone which employs a gas-fired burner, steam, infra-red rays, electrical induction heating, dielectric heating, or the like. Curing may also be effected by employing a heated conveyor belt. Additionally, it may also be effected by employing a heat-affording fluid medium, i.e., not only hot gases but also liquids which are conveniently handled at the elevated curing temperatures desired, e.g., molten metals, non-metallic liquids which are heat stable at the desired curing temperature, combinations of molten metals (as a lower layer) and non-metallic, heat-stable liquids (as an upper layer), or the like. The selection of a suitable medium or media is within the skill of the art in the light of the present disclosure.

A typical low-melting metal that can be used at a suitably elevated curing temperature, e.g., about 600° F., is the eutectic mixture, 58% bismuth and 42% tin (e.g., Asarcolo 281, American Smelting and Refining Co.). Another example is an alloy of 52% bismuth, 40% lead and 8% cadmium. When employing such metals, the gasket may be treated with a dust (talc or soapstone) or oil coating to prevent the molten metal from clinging to the cured gasket.

The non-metallic, heat-stable liquid selected may be a high-flash-point petroleum based oil but is preferably a water-soluble organic liquid, e.g., a polyalkylene glycol containing a heat stabilizing antioxidant (e.g., Ucon 50–HB–280–X Carbide and Carbon Chemicals Co., which is suitably used at about 400 to 500° F.). Such organic liquids may be, for example, a combination of polyethylene glycol and butylated ether of polyethylene glycol, the exact proportions depending on the desired viscosity. The attribute of water solubility is advantageous because, after curing, any residual liquid may be readily removed by the simple expedient of a water bath, water wash, or the like.

With such metallic and non-metallic liquid media and relatively-thin gaskets, curing temperatures are usually in the range of 350° to 700° F., e.g., 400° to 600° F., with contact times, in some instances, as short as a minute or even less, e.g., ten seconds to three minutes. In general, the higher the curing temperature, the shorter the requisite contact time.

In another embodiment of the present invention, the uncured-rubber-containing stock, usually prior to cutting or punching into gasket configurations, may be subjected to a freezing step. Specifically, the temperature of the stock may be reduced to a point where the stock becomes substantially stiff or rigid so that after the gasket configuration is cut or punched therefrom, it will retain its shape until it is frictionally restrained for the curing step. Thus, the gasket configuration can be handled, manually or mechanically, without becoming mis-shapen. The freezing step thus obviates any need for carefully placing and adjusting the gasket between the sandwich plates so as to have the same shape or configuration produced by the cutter or puncher. In practice, the frozen stock may be handled like sheet metal, and the frozen gasket configurations "kicked" or otherwise propelled from the gasket-punching operation to the frictionally-restraining step.

The particular temperature to which the gasket is lowered during the freezing step depends, in part, on the formulation of the stock. Normally, a temperature of 0° F. or less, usually less, e.g., in the range of about 0° F. to −100° F., is required. Various techniques for achieving such low temperatures may be employed and are considered within the skill of the art.

In general, either gaseous or liquid freezing media may be employed, the particular medium usually being selected from many, which are suitable, on the basis of design and economic considerations. For example, where extreme temperatures are not required, cold air may be employed; in other cases liquid oxygen, liquid nitrogen, or the like may be employed. Alternatively, very-low-freezing-point liquids, e.g., various standard anti-freeze materials, e.g., ethyl alcohol, may be employed, the temperature being controlled by, for example, refrigeration coils or by introducing solid carbon dioxide (Dry Ice) therein. Contact times in the freezing medium depend, of course, on the formulation of the material, the thickness thereof, the desired temperature to be achieved, and the like, all being within the skill of the art and, for any particular formulation, readily determinable by routine experimentation.

In still another specific embodiment of the present invention, the process is carried out as a continuous operation. For example, a continuous sheet of uncured-rubber-containing stock is continuously fed to a cutter or puncher, optionally after having been subjected to a freezing step, wherein the gasket configurations are continuously cut or punched from the stock. When employing stationary die cutters or punchers for this latter operation, some slack in the continuously-fed sheet should be present to allow and compensate for the momentary stoppage of the sheet beneath the cutter or puncher for the cutting or punching operation. Alternatively, particularly where the stock has been subjected to a freezing step, the feeding operation to the cutter or puncher may be intermittently-continuous, the intervals between movements depending on the speed of the cutting or punching operation. Such techniques for cutting of flexible and inflexible materials are well known to the art.

The center portions or slugs, which are punched out to form the internal periphery of the gasket, and the external "skeleton" or web, which is removed to form the external periphery, may be continuously returned to the sheet-forming operation, where the scrap material is reprocessed. In an advantageous embodiment, the "skeleton" may be returned as a continuous web of material.

In a particular embodiment of the present invention, the continuous cutting may be carried out on a rotary drum cutter. In this embodiment, the cutters or dies are on the surface of a rotating drum, and a sheet of the uncured gasket material is passed between the drum and an opposing surface or roll. After cutting, the gaskets are then ejected; and the scrap material is returned for reforming into sheets and recycling.

The gasket configurations from the punching or cutting operation are then continuously introduced between apposed, moving, restraining plates or surfaces and, while so restrained with respect to both physical displacement and thermal effects, particularly distortion-producing release of process strains, are subjected to curing conditions. The cured gaskets may then be automatically unloaded, packaged, and sent to inventory or shipping by conventional techniques.

The present invention will be more clearly understood from consideration of the accompanying drawings, which form a part of this specification, wherein:

FIGURE 1 illustrates the "book" embodiment of the apparatus employed in the practice of the present invention, wherein a plurality of the restraining plates, which are hinged, and the gaskets are alternately stacked in preparation for curing;

FIGURES 2, 2a, 3, 3a, 3b, 4, 5, 6, 6a, and 7 illustrate typical examples of the types of surfaces which may be employed for the restraining plates for those embodiments wherein the restraint is obtained by interrupted or non-smooth surfaces.

FIGURE 8 is another embodiment of the apparatus employed in the practice of the present invention wherein a plurality of restraining plates and gaskets are alternately stacked in a holding frame, which is subsequently placed in a curing zone for effecting cure of the restrained gaskets; and FIGURE 9 illustrates, in schematic form, one form of apparatus which may be employed in the practice of the present invention on a continuous basis.

Referring to FIGURE 1, there is shown a so-called "book" embodiment of the apparatus employed in the practice of the present invention, wherein the restraining plates are hinged at one side. The unit comprises base 10, having hinge uprights 11a and 11b, which are threaded through hinge eyelets 12a, 12b, 12a', 12b', 12a'', 12b'', and so forth. Two of the hinge eyelets are secured to one edge of each of the restraining plates 13, 13' (which is partly broken away for purposes of illustration), 13'', and so forth, respectively. In this specific embodiment, the plates are aluminum, but, as aforementioned, they may comprise other metals or non-metals, e.g., sheets of Teflon (E. I. du Pont de Nemours & Co.'s registered trademark for a plastic consisting of tetrafluoroethylene polymer). Between the restraining plates are sandwiched a plurality of irregularly-shaped, uncured-rubber-containing gaskets 14a, 14b and so forth, which are subsequently subjected to curing conditions.

As a typical example, the irregularly-shaped uncured gaskets may be automobile cylinder head cover gaskets having a thickness of about 0.125±0.010 inch. Such a gasket may be formulated by compounding the following raw materials.

| Ingredients: | Weight parts |
| --- | --- |
| Butadiene acrylonitrile rubber | 100 |
| Medium thermal carbon black | 200 |
| Lignin | 25 |
| Paraffin wax | 2 |
| Phenyl-beta-naphthylamine | 1.5 |
| Zinc oxide | 5 |
| Stearic acid | 1.5 |
| Sulfur | 1.3 |
| Plasticizer (aromatic petroleum derivative) | 22.5 |
| Benzothiazyl disulfide | 1.3 |
| Tetramethyl thiuram monosulfide | 0.5 |
| Para-coumarone-indene resin (M.P. 40° C.) | 12.5 |

It should be understood, of course, that the above formulation is illustrative only and not by way of limitation. Various formulations containing natural and/or synthetic rubbers, including the newer substituted rubbers, e.g., the silicon-based or boron-based rubbers, lend themselves to the practice of the present invention. Typically, the rubber content of the formulation, which may be solid or in a foamed or sponge state, is in the range of about 10 to 95% by weight.

So that the restraining plates 13, 13', 13'', etc., will have a sufficiently-high coefficient of friction so as to restrain the gaskets 14a, 14b, etc., at least one surface of the restraining plates is "dimpled," as is suggested by the tiny circles on the plates in FIGURE 1. With such dimples, which will be illustrated in magnified detail in FIGURES 2 and 2a, no additional weight need necessarily be added to the stack of alternating restraining plates and gaskets inasmuch as the weight of the plates themselves sometimes provides sufficient frictional restraint to prevent distortion of the gaskets during subsequent cure. This is particularly true in the case of the gaskets at the lower portion of the stack. In some instances, it has been found desirable to add additional weight at the top of the stack so that there is sufficient weight to adequately restrain the gaskets adjacent to the top.

A non-smooth (and/or tacky) surface at least on one side of the restraining plates is important in the practice of the present invention. While sheer weight alone on smooth plates is capable of restraining the gaskets during cure, sheer weight alone is sometimes accompanied by the undesirable and excessive (substantially more than about 20%) squashing of the gasket. Thus, the thickness of the gasket may be less than desired and the accompanying "spread" of the gasket may permanently distort its internal and external periphery to an undesirable extent.

In the practice of the present invention, such permanent distortion is avoided by employing non-smooth (and/or tacky) surfaces for frictionally restraining the stock and by avoiding distortion-producing weight. Where a plurality of the apposed restraining plates are employed in a stack, excessive weight on the gaskets, particularly adjacent the bottom of the stack, may be avoided by preventing the full weight of the overhead plates and gaskets from bearing on the bottom gaskets, for example, by employing spacers or the like between the non-smooth restraining plates.

The types of non-smooth surfaces on one or both surfaces of the restraining plates can take a variety of forms. For example, a restraining plate can be produced by the simple expedient of forming a plurality of jagged perforations in a metal sheet. Similarly, the restraining plate may be produced from a wire screen, wherein the undulated interlocking of the wires themselves provides sufficient friction. Other typical examples of suitable surfaces for the restraining plates are illustrated in FIGURES 2 through 7.

Referring to the embodiment of FIGURES 2 and 2a, which is the type of surface typically used in the embodiment of FIGURE 8 (to be discussed hereinafter), the restraining plate 15 is made of 0.032-inch-thick sheet aluminum, wherein the upraised portions, or tines 16, are about 0.025 inch high, resulting in an over-all thickness of 0.057 inch from the bottom of plate 15 to the top of tines 16. Tines 16 are spaced at intervals of about 0.176 inch center-to-center. While tines 16 of FIGURES 2 and 2a are punched in only one direction, they may also be punched in the opposite direction. Alternatively, two sheets with tines 16 punched in only one direction may be secured together back-to-back (as is the case in the embodiment of FIGURE 8).

In FIGURES 3, 3a and 3b tines 17 contrast with those of FIGURES 2 and 2a in that they are raised to a higher level above plate 18, are substantially pointed and otherwise differ somewhat in configuration. Such sharp-pointed tines may advantageously be used in connection with a particular embodiment of the present invention wherein the gasket configuration is restrained by simply laying the gasket on a single restraining plate without an overlaying restraining plate on top, i.e., the "open-face" embodiment in contrast to the "sandwich" embodiment. Other surfaces for the restraining plates, of course, also lend themselves to the "open-face" embodiment, as is apparent from the present disclosure.

In FIGURE 4, the grid effect is produced on plate 19 by means of criss-crossed upraised portions 20. In FIGURE 5, the non-smooth surface of plate 21 is produced by roughening the surface with a coarse grindstone, thereby resulting in a host of fine striations. In FIGURES 6 and 6a, plate 23 is punctured with rectilinear apertures 24 in one direction and 25 in the opposite direction. In FIGURE 7, both sides of plate 26 have upraised nubs 27, producing a "waffle" effect (without any leak-producing continuous channels). These are only a few examples of many types of non-smooth surfaces which would be operative for purposes of the present invention.

While, in many instances, the upraised portions on the restraining sheets do result, after cure, in corresponding depressions or "dimples" in the gasket surface, it has been unexpectedly discovered that such depressions, may, in some instances, have a surprising advantage. Specifically, the "dimpled" surface results in areas of greater localized pressure with enhanced compressibility and ability to seal slight irregularities in the abutting surfaces.

In FIGURE 8, there is illustrated another batch-type apparatus for practice of the present invention. The apparatus comprises holding frame 28, having upstanding corner guides 28a, 28b, 28c, and 28d, and a plurality of carrying handles, only one of which 28e can be seen in this perspective view. Each of the plurality of restraining plates 29, 30, etc., comprise two plates such as shown in FIGURES 2 and 2a, placed back-to-back and secured together by means of folded-over edge portions 29', 30', etc.

In a specific embodiment of the apparatus of FIGURE 8, the frame is slightly over one foot wide and about three feet long. The upstanding portions 28a–28d are approximately one foot high, whereby sufficient space is made available for about 40 to 60, or more, of the restraining plates, each of which weighs about three pounds, twelve ounces, and between which are restrained irregularly-shaped gasket configurations having the previously-described formulation and a thickness of about 0.125±0.010 inch.

To avoid excessive squashing of the gaskets, particularly at the lower levels, spacers are provided adjacent the interinal and external peripheries of the gaskets. Typically, the spacers are strips of the same rubber composition, but cured, and having a thickness of about 0.093 inch. They are placed adjacent the internal and external peripheries of the gaskets. To assure sufficient pressure at the upper levels, a weight, e.g., a flat steel plate with a configuration similar to the restraining plates and weighing about 87 pounds, is placed over the top restraining plate.

To effect cure, the supporting frame and stack of gaskets is placed in a steam vulcanizer or autoclave, employing 60 p.s.i.g. steam (about 307° F.), for a period of one hour, although periods as short as 20 minutes have been satisfactorily employed at this temperature. Dry heat has also been used in connection with this embodiment.

In FIGURE 9, there is presented a schematic diagram suggesting the preferred continuous type of operation to which the process of the present invention lends itself. Conveyor belt 32 supplies a continuous sheet of uncured-rubber-containing stock 33, optionally frozen to a stiff or rigid state, to a die cutter or puncher 34 wherein gasket configurations 35 are punched from the continuous sheet 33.

Scrap centers or slugs 36 are dropped into scrap container 37 which is preferably continuously returned to the preceding sheeting operations (not shown) for reworking (after thawing, if frozen). Similarly, a continuous web of scrap material 38 is also returned to the sheeting operation for reworking, whereby substantially no scrap losses are incurred.

Gasket configurations 35 are dropped on to the moving belt 39, said belt having a non-smooth surface. Moving belt 39 draws the gaskets 35 between itself and an overhead moving belt 40, which also preferably has a non-smooth surface. The moving gaskets, which are now restrained between moving belts 40 and 39, are then conveyed through a curing zone 41, wherein they are subjected to curing conditions such as earlier described.

After leaving curing zone 41, the cured gaskets 43 are conveyed to an inspection and packaging area (not shown), wherein they are prepared for storage or shipment.

It should be emphasized that the continuous embodiment shown in FIGURE 9 is illustrative only and many variations may be introduced without departing from the spirit and scope of the invention. For example, instead of the gaskets being sandwiched between continuous moving belts, the lower and upper belt may actually comprise a series of rigid plates which are hinged to each other at respective parallel edges. These and other variations are considered within the skill of the art in the light of the present disclosure.

In the preferred embodiment of the present invention a sheet of uncured-rubber-containing stock is optionally subjected to freezing conditions so as to lower the temperature to a level at which the stock is rigid, e.g., about −50° F. The sheet of rigid stock is then continuously fed to a cutting operation wherein gasket configurations are cut therefrom, thereby producing scrap gasket centers and a continuous scrap web of material. At least the scrap web is continuously returned to the sheet forming operation for reworking. The gasket configurations are continuously conveyed to a restraining zone wherein they are sandwiched successively between moving, apposed, non-smooth plates, whereby they are frictionally restrained. While so restrained, the gaskets are then immersed in a heat-stable, water-soluble polyalkylene glycol bath for about 10 seconds to 3 minutes at a bath temperature of about 400 to 500° F., e.g., 450° F., whereby the uncured rubber content of the stock is cured. The cured gaskets are water washed to remove any residual polyalkylene glycol and are then inspected and packaged for storage or shipment.

It is apparent from the above description of certain specific embodiments of the present invention that the objects thereof have been achieved. Specifically, a method and apparatus is provided for the low-cost manufacture of rubber-containing gaskets, particularly irregularly-shaped gaskets, which method and apparatus dispenses with high-cost curing forms and lends itself to either large or small-volume production runs as well as automated (continuous) production techniques. Even more specifically, a waste-free method is provided for the manufacture of gaskets whereby the gaskets may be cut to the desired finished configuration from uncured stock and cured without need for costly curing forms.

While the present invention has been described in connection with certain specific embodiments thereof, it should be understood, as aforementioned, that these embodiments are illustrative only and that the invention is not necessarily limited thereto. For example, while the specific embodiments are directed to rubber-containing gaskets, the invention readily lends itself to the manufacture of various articles from any polymeric material or materials subject to cross-linking during cure, e.g., phenolic resins, epoxy resins, polyester resins, and the like. As another example, while the term "frictionally restraining" has been described in terms of restraining the gaskets by means of non-smooth plates, e.g., plates with upraised protrusions or points, or with roughened, uneven, or irregular surfaces thereon, it should be understood that the gasket can also be restrained by using a smooth surface coated with a tacky substance or vulcanizable cement to adhere the gasket thereto, at least during the curing operation. For such purpose, the cement should preferably comprise the same basic polymer as the gasket itself and may optionally be applied to the gasket surfaces rather than the plates. Specifically, when employing the gasket formulation hereinabove detailed, the tacky cement, which should preferably vulcanize after the gasket under the curing conditions employed, may comprise 100 parts by weight of liquid butadiene acrylonitrile rubber, 30 parts parts phenyl-beta-naphthylamine, 5 parts of zinc oxide, 1.0 part stearic acid, 4–6 parts sulfur, and 0.75 part tetramethyl thiuram monosulfide. Many other modifications of the present invention will be apparent, in the light of the foregoing description, to those skilled in the art; and such modifications are considered within the spirit and scope of the present invention.

Having thus described the invention, what is claimed is:

1. A process for the manufacture of a gasket configuration from uncured gasket stock, which stock when unrestrained is subject to distortion upon being subjected to curing conditions, which process comprises the steps of:
   (a) cutting the desired gasket configuration from said stock;
   (b) supporting the resulting gasket configuration in direct contact with a substantially-rigid surface having a substantial coefficient of friction with respect thereto, whereby the gasket configuration is frictionally restrained without substantial squashing thereof;
   (c) subjecting the gasket configuration while so supported to curing conditions for a period sufficient to effect cure thereof, whereby the shape of the gasket configuration is controlled without substantial distortion during curing thereof; and
   (d) withdrawing the cured gasket configuration from said curing conditions.

2. A process for the manufacture of gaskets which comprises the steps of:
   (a) sheeting an uncured-rubber-containing gasket stock, which stock after sheeting is normally subject to distortion upon curing;
   (b) shaping a gasket configuration from the sheeted stock with the accompanying production of scrap stock;
   (c) recycling scrap stock from the shaping step to the sheeting step;
   (d) supporting the gasket configuration in direct contact with a substantially-rigid surface having a substantial coefficient of friction with respect thereto, whereby the gasket configuration is frictionally restrained without substantial squashing thereof;
   (e) subjecting the gasket configuration while so supported to curing conditions for a period sufficient to effect cure thereof, whereby the shape of the gasket configuration is dimensionally stabilized while undergoing cure; and
   (f) withdrawing the resulting undistorted cured gasket configuration from said curing conditions.

3. A process for the manufacture of gaskets which comprises the steps of:
   (a) sheeting an uncured-rubber-containing gasket stock, which stock after sheeting is normally subject to distortion upon curing;
   (b) subjecting the sheeted stock to freezing conditions for a period sufficient to render it substantially rigid;
   (c) cutting a gasket configuration from the sheeted stock while so frozen;
   (d) supporting the gasket configuration in direct contact with a substantially-rigid surface having a substantial coefficient of friction with respect thereto, whereby the gasket configuration is frictionally restrained without substantial squashing thereof;
   (e) subjecting the gasket configuration while so supported to curing conditions for a period sufficient to effect cure thereof, whereby the gasket configuration is dimensionally stabilized from the time it is cut to the time it is cured; and
   (f) withdrawing the resulting undistorted cured gasket configuration from said curing conditions.

4. A continuous process for the manufacture of gaskets which comprises the steps of:
   (a) forming an uncured-rubber-containing gasket stock into an elongated sheet, said sheet normally being subject to distortion upon curing;
   (b) continuously feeding the sheet to a cutting zone;
   (c) continuously cutting gasket configurations from the sheet with the simultaneous production of scrap stock;
   (d) returning the scrap stock to the forming step for resheeting;
   (e) supporting each of the gasket configurations in direct contact with a substantially-rigid moving surface having a substantial coefficient of friction with respect thereto, whereby the gasket configurations are frictionally restrained without substantial squashing thereof;
   (f) moving the gasket configurations while so supported through a curing zone wherein the gasket configurations are subjected to curing conditions for a period sufficient to effect cure thereof, whereby the gasket configurations are dimensionally stabilized while undergoing cure; and
   (g) removing the resulting undistorted cured gasket configurations from said curing zone.

5. A continuous process for the manufacture of gaskets which comprises the steps of:
   (a) sheeting an uncured-rubber-containing gasket stock, said stock after sheeting normally being subject to distortion if cured without restraint;
   (b) subjecting the sheeted stock to freezing conditions for a period sufficient to render it substantially rigid;
   (c) punching gasket configurations from the sheeted stock while so frozen with the simultaneous production of scrap stock;
   (d) recycling the scrap stock to the sheeting step for resheeting;
   (e) supporting the gasket configurations in direct contact with a moving, substantially-rigid surface, said surface having a substantial coefficient of friction with respect thereto, whereby the gasket configurations are frictionally restrained without substantial squashing thereof;
   (f) subjecting the gasket configurations while so supported on said surface to curing conditions for a period sufficient to effect cure thereof, whereby the gasket configurations are dimensionally stabilized while undergoing cure; and
   (g) removing the resulting undistorted cured gasket configurations from said curing conditions.

6. A continuous process for the production of gaskets which comprises the steps of:
   (a) forming an uncured-rubber-containing gasket stock into a continuous sheet, said sheet normally being subject to distortion if cured without restraint;
   (b) continuously feeding the continuous sheet to a cutting zone;
   (c) continuously cutting gasket configurations from the sheet with a simultaneous production of scrap stock;
   (d) recycling the scrap stock to the forming step for resheeting;
   (e) supporting each of the gasket configurations between and in direct contact with moving apposed surfaces, at least one of said surfaces being substantially rigid and at least one of said surfaces having a substantial coefficient of friction with respect to the gasket configurations, whereby the gasket configurations are frictionally restrained without substantial squashing thereof;
   (f) moving the gasket configurations while so supported through a curing zone wherein the gasket configurations are subjected to a heat-affording fluid medium for periods sufficient to effect substantial cure thereof, whereby the gasket configurations are dimensionally stabilized while undergoing cure; and
   (g) removing the resulting undistorted cured gasket configurations from said curing zone and from between said apposed surfaces.

7. The process of claim 6 wherein the heat-affording fluid medium comprises a molten metal at a temperature in a range of about 350° to 700° F.

8. The process of claim 6 wherein the heat-affording fluid medium comprises a heat-stable, water-soluble organic liquid at a temperature in a range of about 350° to 700° F., and including the step of water washing the gasket configurations after cure to remove any residual organic liquid.

References Cited in the file of this patent

UNITED STATES PATENTS

| | | |
|---|---|---|
| 1,440,371 | Britton | Jan. 2, 1923 |
| 2,310,619 | Dillehay | Feb. 9, 1943 |
| 2,972,593 | Daly | Feb. 21, 1961 |

UNITED STATES PATENT OFFICE
CERTIFICATE OF CORRECTION

Patent No. 3,093,443　　　　　　　　　　　　　　　　June 11, 1963

Herbert H. Levinson

It is hereby certified that error appears in the above numbered patent requiring correction and that the said Letters Patent should read as corrected below.

Column 7, line 10, after "depressions" strike out the comma; line 37, for "interinal" read -- internal --; column 8, line 74, after "parts" insert -- medium thermal carbon black, 2 parts paraffin wax, 1.5 --.

Signed and sealed this 3rd day of December 1963.

(SEAL)
Attest:
ERNEST W. SWIDER

EDWIN L. REYNOLDS

Attesting Officer

Acting Commissioner of Patents